(12) United States Patent
Niles et al.

(10) Patent No.: US 11,005,251 B2
(45) Date of Patent: May 11, 2021

(54) APPARATUS FOR PROTECTING A COMPONENT OF A POWER DISTRIBUTION SYSTEM AGAINST WILDLIFE

(71) Applicant: Cantega Technologies Inc., Edmonton (CA)

(72) Inventors: Martin S. Niles, Stony Plain (CA); Keith Yeats, Red Deer (CA); Edmond LeRouzic, Edmonton (CA); Paul Alfaro, Anaheim, CA (US); Dick Yokota, Soquel, CA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/144,690

(22) Filed: Sep. 27, 2018

(65) Prior Publication Data
US 2020/0083694 A1 Mar. 12, 2020

(30) Foreign Application Priority Data
Sep. 12, 2018 (CA) .................. CA 3017155

(51) Int. Cl.
| | | |
|---|---|---|
| *H02G 15/113* | (2006.01) | |
| *H02G 1/02* | (2006.01) | |
| *H01B 17/00* | (2006.01) | |
| *H02G 7/00* | (2006.01) | |

(52) U.S. Cl.
CPC ......... *H02G 15/113* (2013.01); *H01B 17/005* (2013.01); *H02G 1/02* (2013.01); *H02G 7/00* (2013.01)

(58) Field of Classification Search
CPC .... H01H 85/25; H01H 69/02; H01H 85/0026; H01H 85/175; B29C 45/1676; B29C 45/2673; H02G 15/113; H02G 1/02; H02G 7/00; H01B 17/005
USPC .................. 337/337, 361, 439, 174, 199
See application file for complete search history.

(56) References Cited

U.S. PATENT DOCUMENTS

| | | | | |
|---|---|---|---|---|
| 2,263,319 A * | 11/1941 | Treanor | ................ | H01B 17/26 174/139 |
| 3,692,927 A * | 9/1972 | Ellaschuk | ................ | H02G 7/00 174/139 |
| 4,845,307 A * | 7/1989 | Cumming | .............. | H01B 17/26 174/5 R |
| 6,255,597 B1 * | 7/2001 | Bowling | ................ | H01B 17/00 174/138 F |
| 6,291,774 B1 * | 9/2001 | Williams | ............... | H01B 17/00 174/135 |
| 6,963,025 B1 * | 11/2005 | Kysely | ................... | H01B 17/00 174/138 F |
| 6,995,313 B1 * | 2/2006 | Barnett | ................. | H01B 17/00 174/138 F |

(Continued)

*Primary Examiner* — Anatoly Vortman
(74) *Attorney, Agent, or Firm* — Ohlandt, Greeley, Ruggiero & Perle, LLP

(57) ABSTRACT

An apparatus for protecting a component of a power distribution system against wildlife, the apparatus comprising a cover having a first wall and a second wall, the first wall and the second wall being spaced apart to receive part of the component; the first wall having an opening for receiving a pin; and a cantilever mount at the opening for supporting the pin in the first wall. Various configurations of cantilever mount and pin may be used. Opposing pins in opposing walls may be used. The pins may extend towards each other and may or may not meet.

11 Claims, 12 Drawing Sheets

(56) References Cited

U.S. PATENT DOCUMENTS

| | | | | |
|---|---|---|---|---|
| 7,154,034 B2* | 12/2006 | Lynch | ............... | H01H 31/006 |
| | | | | 174/5 R |
| 7,276,665 B1* | 10/2007 | Rauckman | ............ | H01B 17/00 |
| | | | | 174/135 |
| 7,297,869 B2* | 11/2007 | Hiller | ............... | H01B 17/00 |
| | | | | 119/174 |
| 7,622,668 B1* | 11/2009 | Tollefson | ............ | H01B 17/00 |
| | | | | 174/135 |
| 8,723,056 B2* | 5/2014 | Kaddas | ............... | H02G 7/00 |
| | | | | 174/520 |
| 8,957,314 B2* | 2/2015 | Niles | ............... | H02G 7/00 |
| | | | | 174/138 F |
| 9,413,153 B2* | 8/2016 | Spencer | ............... | H01F 27/02 |
| 9,656,381 B2* | 5/2017 | Niles | ............... | B25G 3/12 |
| 9,787,071 B1* | 10/2017 | Rauckman | ............ | H02G 3/081 |
| 9,960,586 B2* | 5/2018 | Niles | ............... | H01B 17/00 |
| 2004/0184210 A1* | 9/2004 | Lynch | ............... | H01H 31/006 |
| | | | | 361/104 |
| 2013/0264097 A1* | 10/2013 | Lynch | ............... | H02G 7/05 |
| | | | | 174/168 |
| 2015/0068798 A1* | 3/2015 | Niles | ............... | H01B 17/00 |
| | | | | 174/5 R |
| 2016/0111863 A1* | 4/2016 | Williams | ............... | H02G 7/00 |
| | | | | 174/40 R |

* cited by examiner

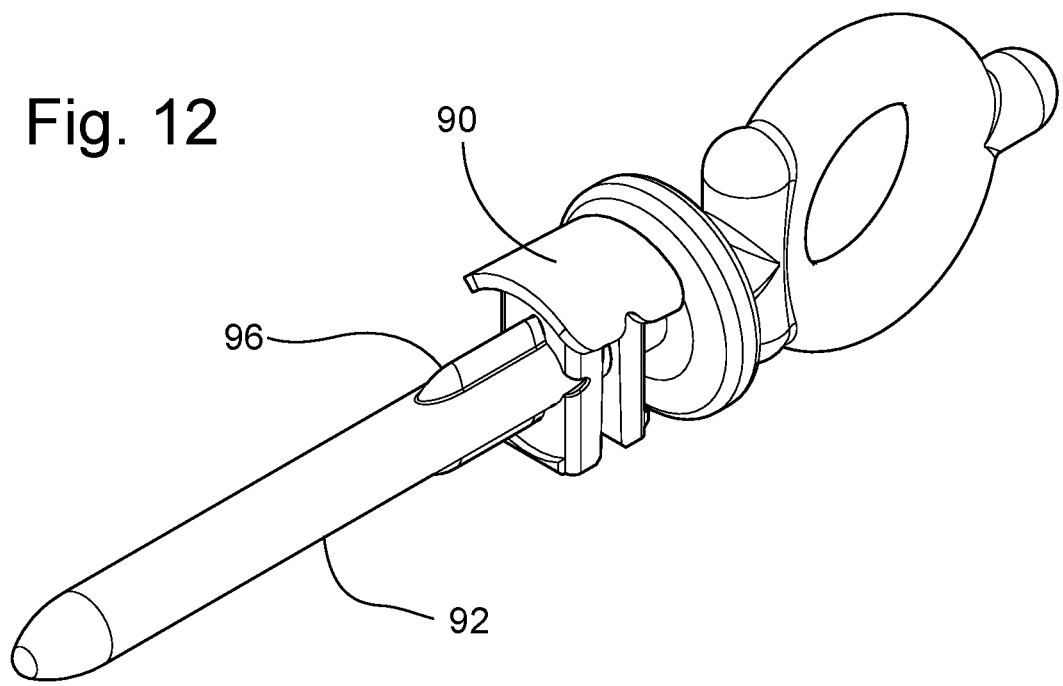
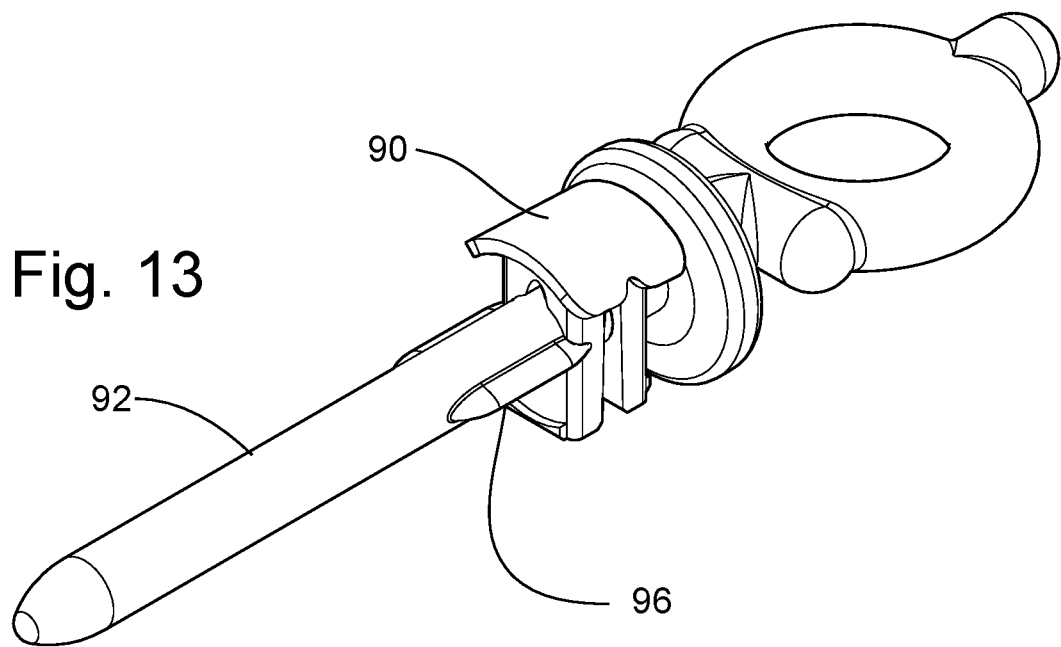

APPARATUS FOR PROTECTING A COMPONENT OF A POWER DISTRIBUTION SYSTEM AGAINST WILDLIFE

TECHNICAL FIELD

Protection of a component of a power distribution system against wildlife.

BACKGROUND

Cover-up is known for protecting components of power distribution systems for example as disclosed in US patent application no. 20150068798A1 published Mar. 12, 2015. Various methods are known for securing covers on components.

SUMMARY

What is disclosed is a new mechanism for securing a cover on a component of a power distribution system. In an example, there is disclosed an apparatus for protecting a component of a power distribution system against wildlife, the apparatus comprising a cover having a first wall and a second wall, the first wall and the second wall being spaced apart to receive part of the component; the first wall having an opening for receiving a pin; and a cantilever mount at the opening for supporting the pin in the first wall. Various configurations of cantilever mount and pin may be used. Opposing pins in opposing walls may be used. The pins may extend towards each other and may or may not meet. The walls may be the walls of a fuse cutout cover, for example the walls of an intermediate portion between an insulator cover part and a fuse cover part. The cantilever mount may be at least partially a tube. The cantilever mount may be formed in a step of the wall. The cantilever mount and pin may have cooperating parts of various type to secure the pin in the cantilever mount.

BRIEF DESCRIPTION OF THE FIGURES

Embodiments will now be described with reference to the figures, in which like reference characters denote like elements, by way of example, and in which:

FIGS. 11, 12 and 13 show a third embodiment of a pin and pin mount;

DETAILED DESCRIPTION

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

Figure 1:
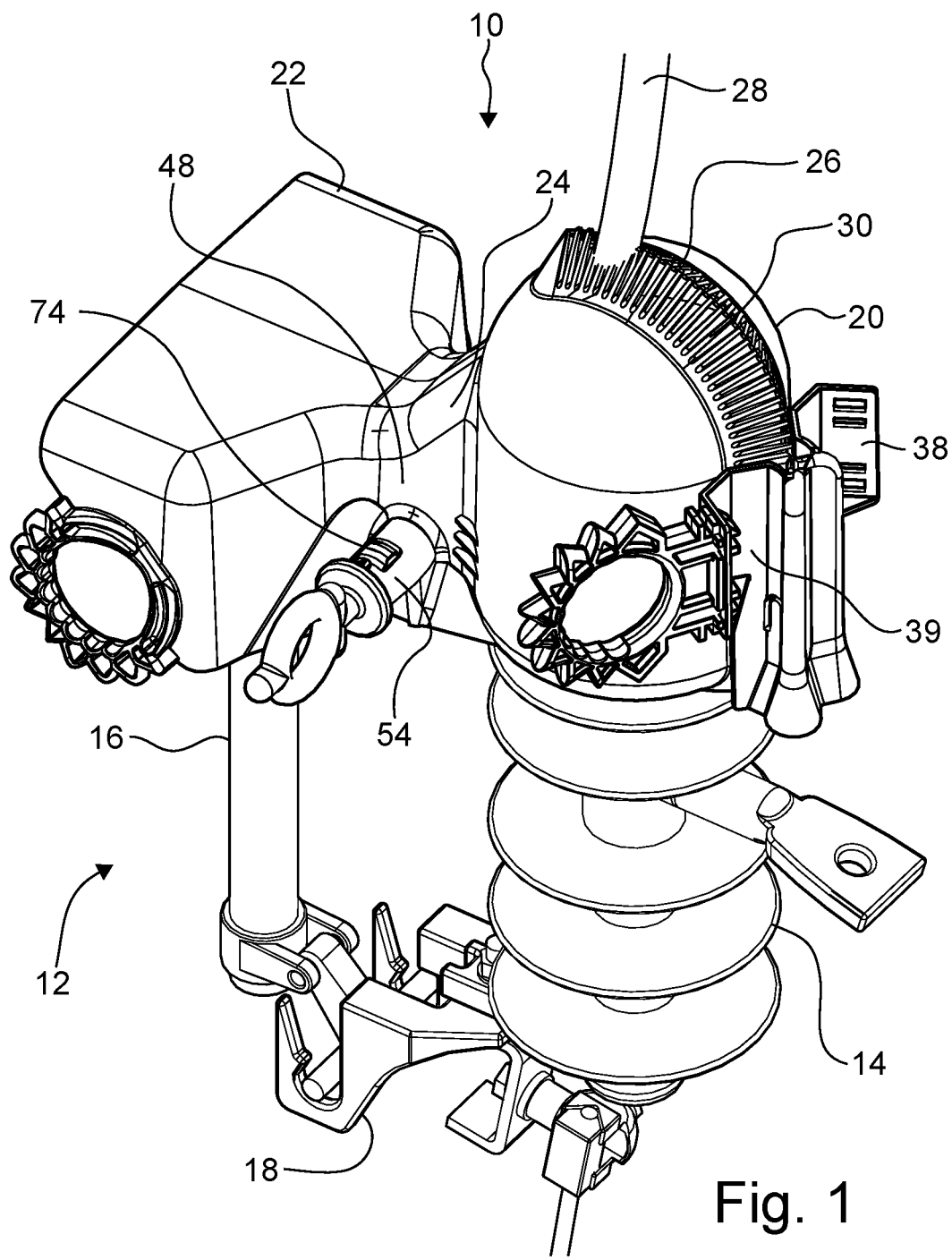
FIG. 1 is a perspective view of a first example of a cover for protecting a component of a power transmission system.
Figure 2:
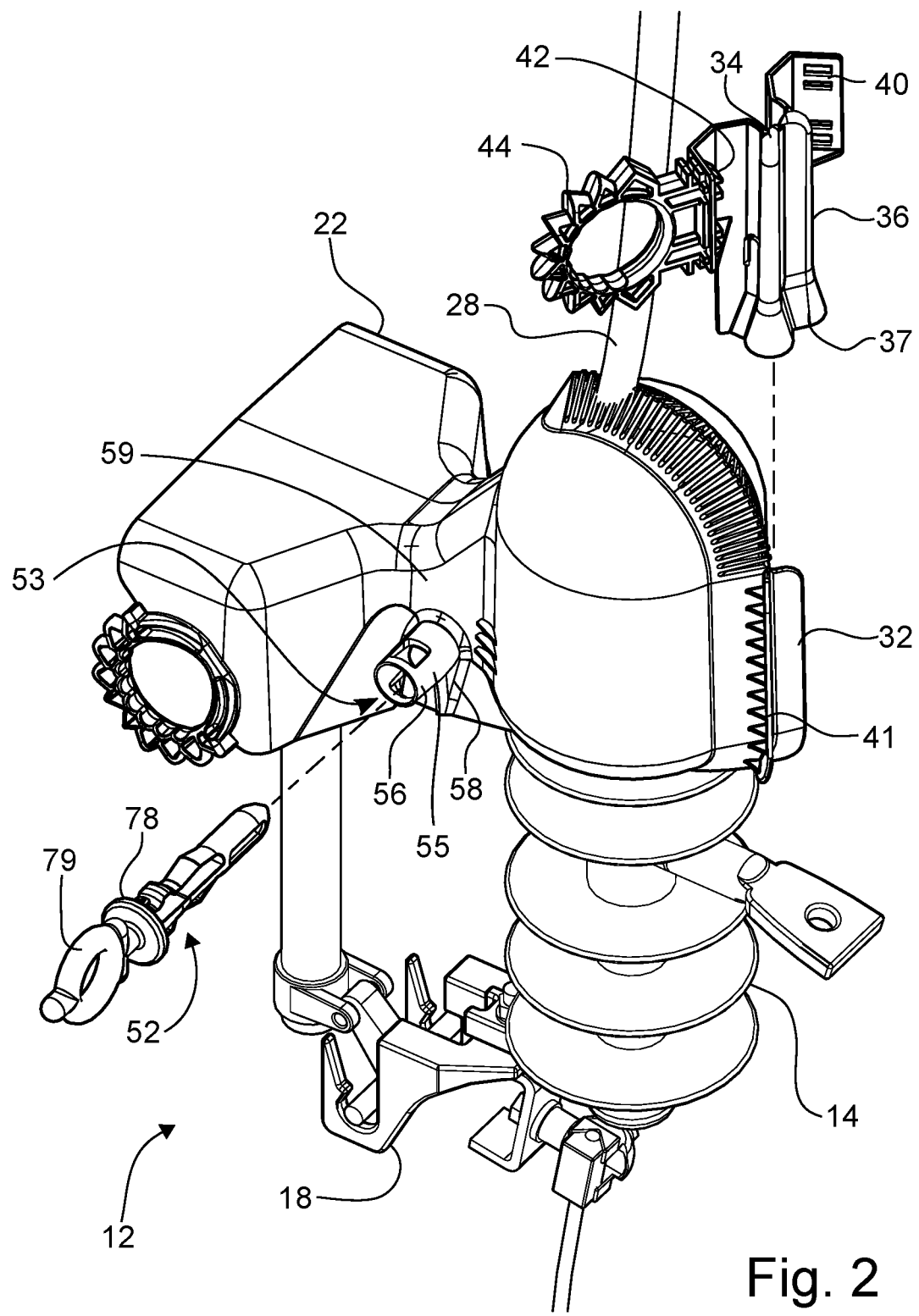
FIG. 2 shows the cover of FIG. 1 with securing parts partially installed.
Figure 3:
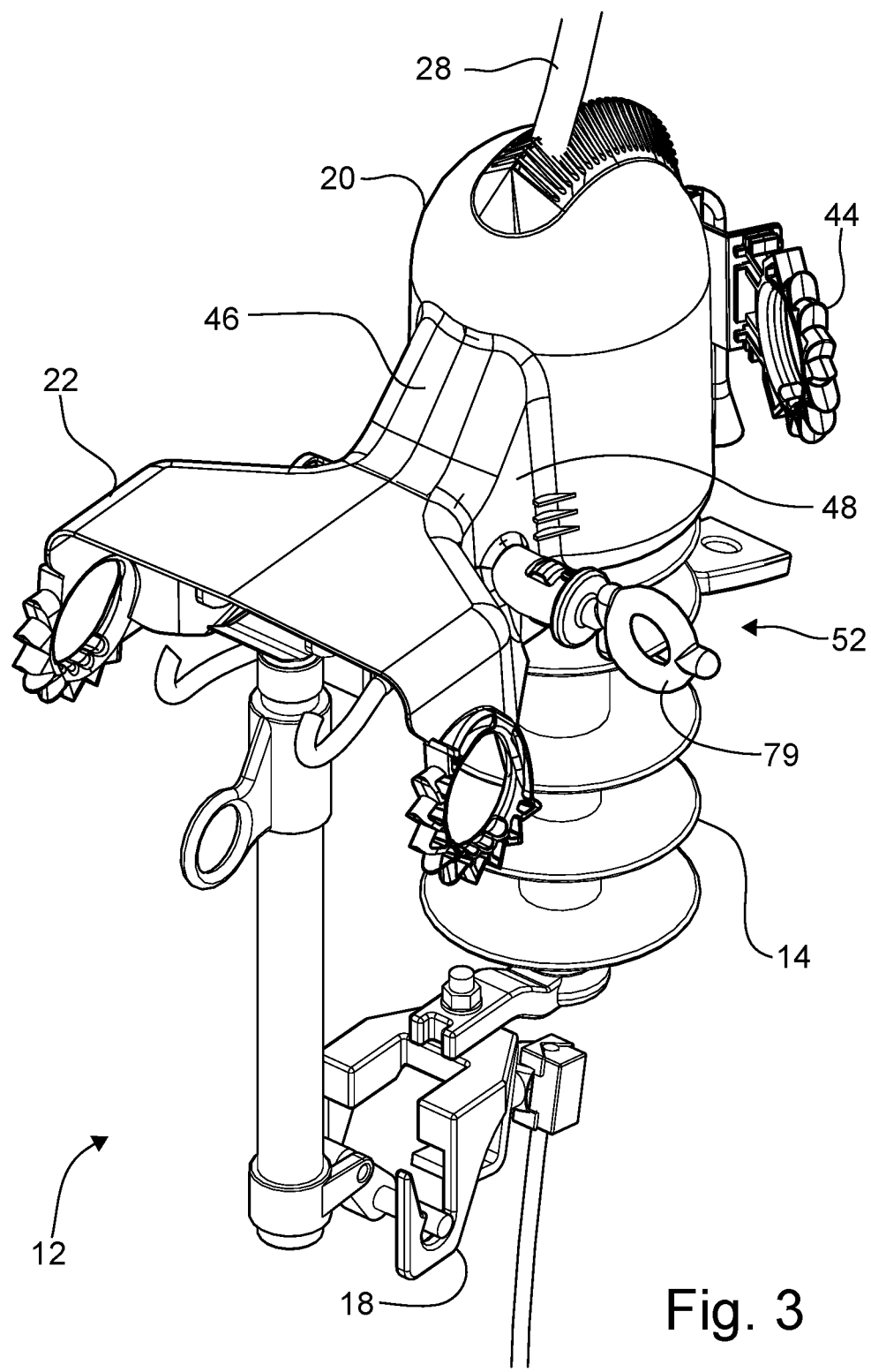
FIG. 3 shows the cover of FIG. 1 with securing parts installed.

FIG. 1 shows a fuse cutout cover 10 example of an apparatus for protecting a fuse cutout 12 example of a component of a power distribution system against wildlife. The fuse cutout 12 comprises an insulator 14 and fuse holder 16 which are connected by a hood (not shown) at the top and lower current path components 18 at the bottom. The fuse cutout 12 is conventional and not further discussed here. The fuse cutout cover 10 in this example has an insulator cover part 20, a contact assembly cover part 22 and an intermediate part 24 that connects the insulator cover part 20 and the contact assembly cover part 22. Additional views of the fuse cutout cover 10 are shown in FIGS. 2, 3 and 4.

The insulator cover part 20 may be formed integrally with the intermediate part 24 and the contact assembly cover part 22 or may be made of separate parts. The insulator cover part 20 is shaped to fit over the insulator 14, which typically has skirts that are circular in horizontal section, and therefore the insulator cover par 20 typically has a cylindrical part for receiving the insulator 14. The insulator cover part 20 may have a slot 26 for receiving a power wire 28 and fingers 30 extending towards each other from both edges of the slot 26 to help prevent wildlife invading the insulator cover part 20. The slot 26 may extend from the top of the insulator cover part 20 through a curved upper part to the bottom of the cylindrical part. The fingers 30 may extend only across the part of the slot 26 that is curved.

Flanges 32 may be provided on the edges of the slot 26 in the cylindrical part of the insulator cover part 20 and the flanges 32 may be received in slots 34 of a clip 36. The clip 36 may have flanges 38, 39 that extend outward from the slots 34 and that each have openings 40 for receiving barbed studs 42 of a hotstick receiving part 44 to lock the hotstick receiving part 44 on the clip 36. The clip 36 is shown separated from the flanges 32 in FIG. 2. Funnels 37 at the bottom of the clip 36 facilitate placing the clip 36 on the flanges 32 by a sliding downwards movement of the clip 36. Features 41 on the flanges 32 may be provided to resist dislocation of the clip 36 from the flanges 32.

Figure 4:
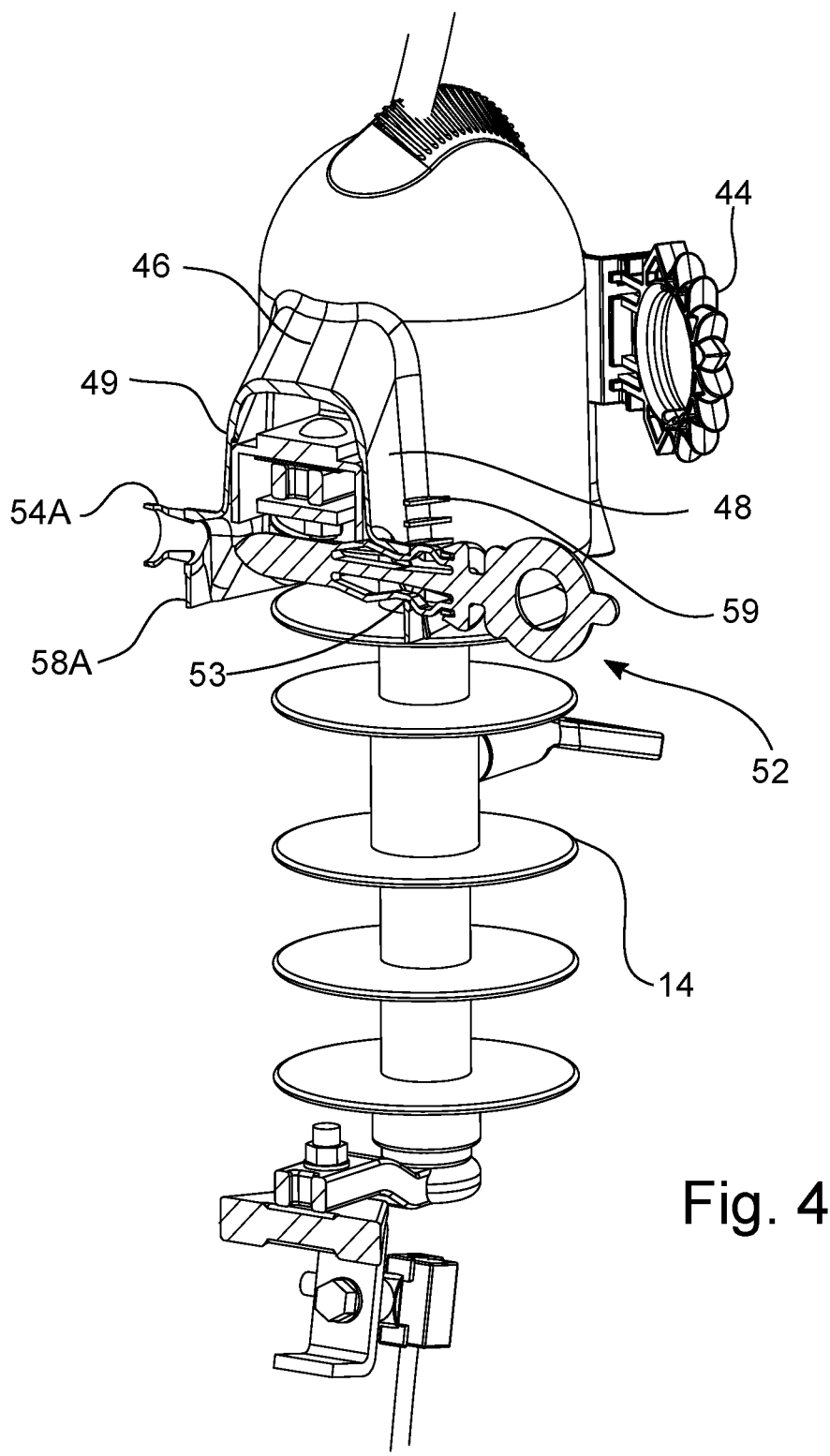
FIG. 4 shows the cover of FIG. 1 with a pin mount and pin shown in section.
Figure 5:
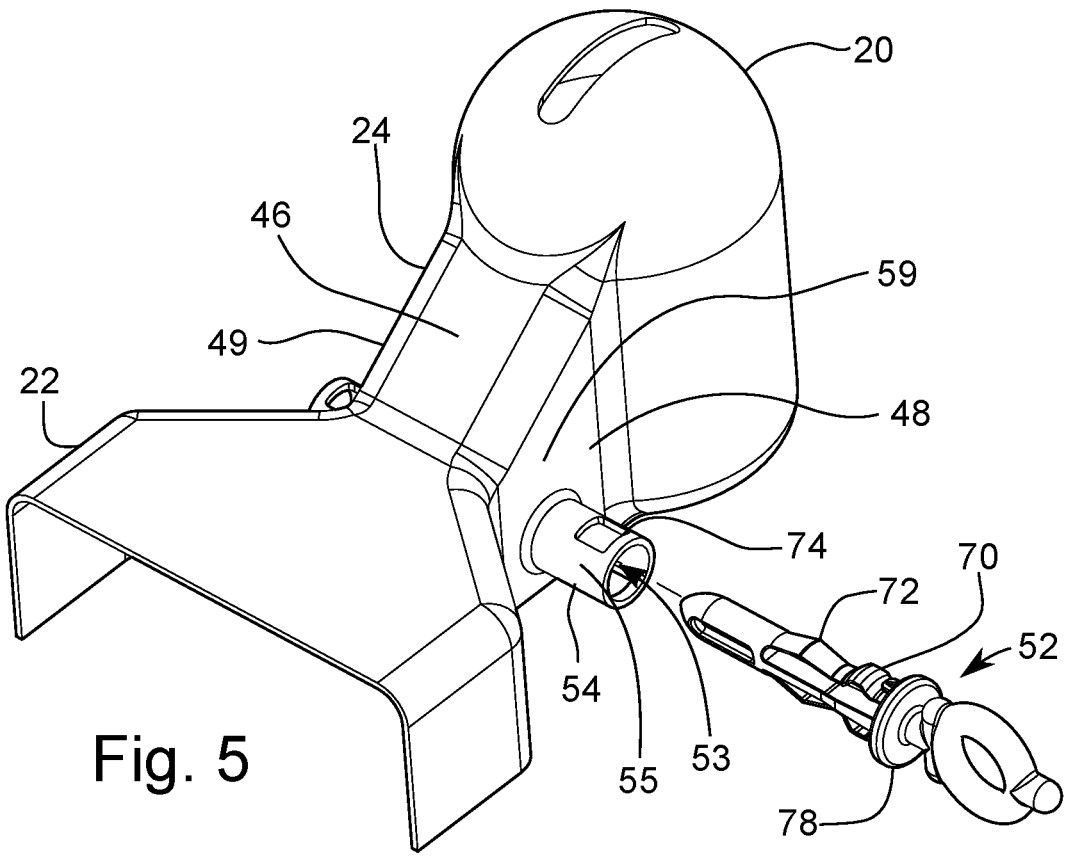
FIG. 5 shows a simplified schematic of the cover of FIG. 1.
Figure 6:
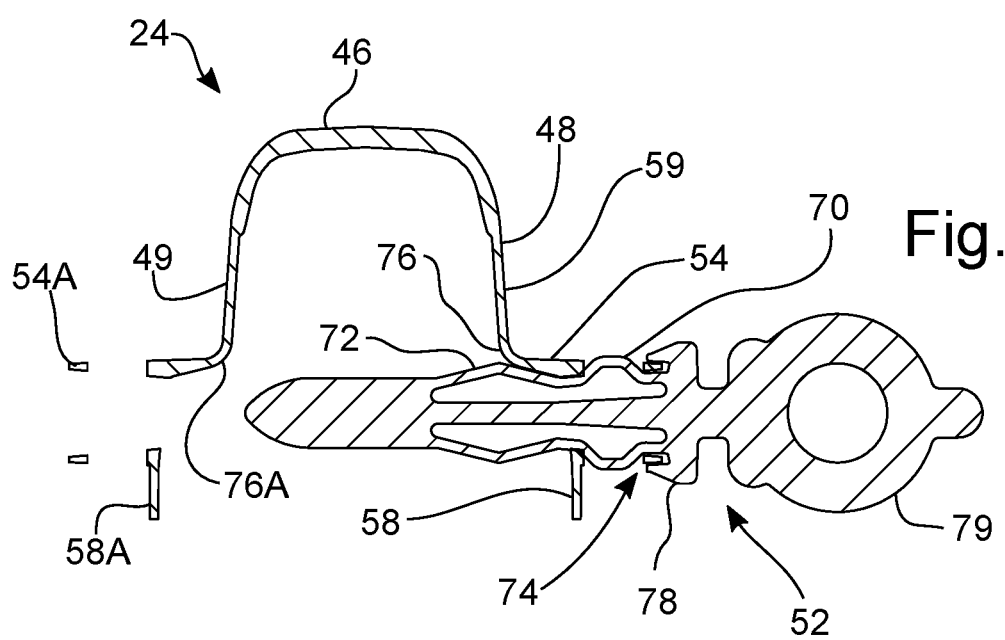
FIG. 6 shows a section through a pin mount with pin.

The intermediate cover part 24 has a top 46, a first wall 48 depending from the top 46 and a second wall 49 depending from the top 46, as better seen in FIGS. 4, 5 and 6. The intermediate cover part 24 may be narrower than the insulator cover part 20 and the contact assembly cover part 22 to form a waist between them. The first wall 48 and second wall 49 are spaced apart to receive the hood of the fuse cutout 12. The first wall 48 or the second wall 49 or both have an opening 53 for receiving a pin 52. A cantilever mount 54 is provided at one or both of the openings 53 for supporting the pin 52 in the first wall 48 or second wall 49 as the case may be. The cantilever mount 54 will now be described in relation to the first wall 48 but the description equally applies to the second wall 49. In FIGS. 4 and 6, cantilever mount 54A is provided in the second wall 49.

The pin 52 is shown separated from the cantilever mount 54 in FIG. 2. The cantilever mount 54 comprises a first portion 56 extending away from the first wall 48 on at least a first side of the first wall 48. In this case, the first side of the first wall 48 is the side furthest from the second wall 49. The first portion 56 forms a support for holding the pin 52 in a cantilever position in the first wall 48.

The first wall 48 and likewise the second wall 49 may each have a step, which in the example shown is formed by the walls 48, 49 stepping outward at 58, 58A respectively below the cantilever mount 54, 54A relative to the respective parts 59 of the walls 48, 49 above the cantilever mount 54. The cantilever mount 54 in this example is thus formed at a step 58 in the first wall 48, or step 58A in the second wall 49. The step 58 in the wall 48 or step 58A in the second wall 49 may extend laterally only the width of the respective cantilever mounts 54, 54A to provide support for the cantilever mounts 54, 54A The cantilever mount 54 may comprise a tube 55 with top and bottom openings as shown in FIGS. 1-6. A simplified schematic of fuse cutout cover 10 is shown in FIG. 5 with insulator cover part 20, contact assembly cover part 22 and intermediate part 24, with walls 48 and 49, only the top of edge of which can be seen in FIG. 5 but it is shown in FIG. 6. A cantilever mount 54 is shown in FIG. 5 in wall 48 and an additional cantilever mount 54A is shown in wall 49 in FIG. 6. A pin 52 is shown in position in FIG. 5 to enter cantilever mount 54 and inserted in FIG. 6. The pin 52 includes pin parts 70, 72, both detents, which may be on both top and bottom sides of the pin 52, that cooperate with corresponding mount parts 74, which is an opening in the tube 55 that forms part of the cantilever mount 54, and 76, a shoulder between the wall 48 and mount 54, to secure the pin 52 in the cantilever mount 54. The pin part 70 comprises a flat topped detent that has sloping sides of equal slope that is depressible to enter the tube 55 that forms a part of cantilever mount 54 and be received by opening 74 in the cantilever mount 54. The part 72 comprises a peaked detent that has sloping sides of equal slope that is depressible to enter the tube 55 that forms part of cantilever mount 54 and bear up against the mount part 76, which corresponds to a shoulder between wall 48 and the cantilever mount 54. A flange 78 on the pin 52 prevents the pin 52 from passing beyond where the detents are secured in the openings. A ring 79 on the pin 52 may be grabbed by a hotstick for operation from outside a safe limit of approach while the transmission system is energized.

A cantilever mount 54 in a first wall 48 is shown in section in FIG. 6, with a pin 52 in the cantilever mount 54. A further cantilever mount 54A is also shown in FIG. 6, without a pin, and showing a step 58A in the wall 49. As shown in FIGS. 4 and 6, the pin 52 extends only part way across the space between the walls 48 and 49 to leave a gap between the tip of pin 52 and the wall 49.

Figure 7:
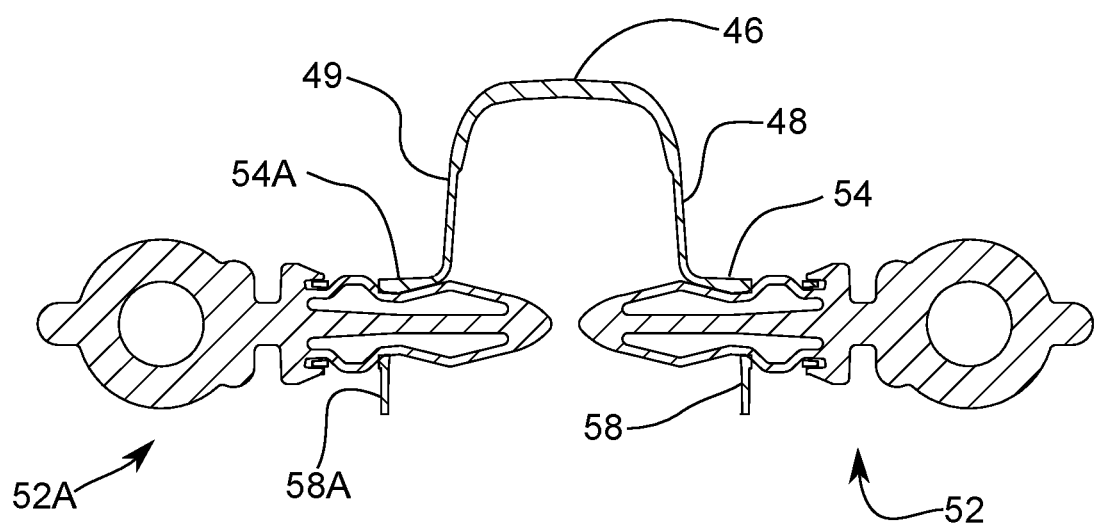
FIG. 7 is a section through the cover of FIG. 1 with two pins installed.

A version of a fuse cutout cover 10 is shown in FIG. 7 that includes an additional pin 52A. As shown in FIG. 7, the pins 52 and 52A do not meet between the walls 48, 49 but leave a gap between them.

Figure 8:
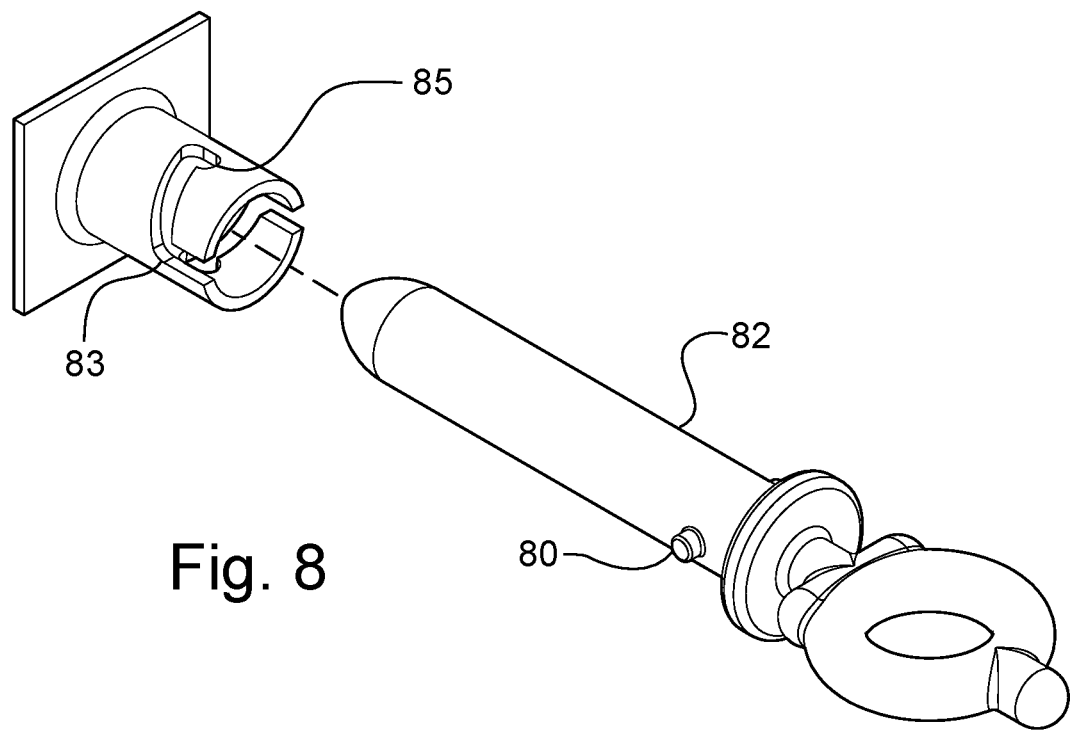
FIGS. 8, 9 and 10 show a second embodiment of a pin and pin mount.
Figure 9:
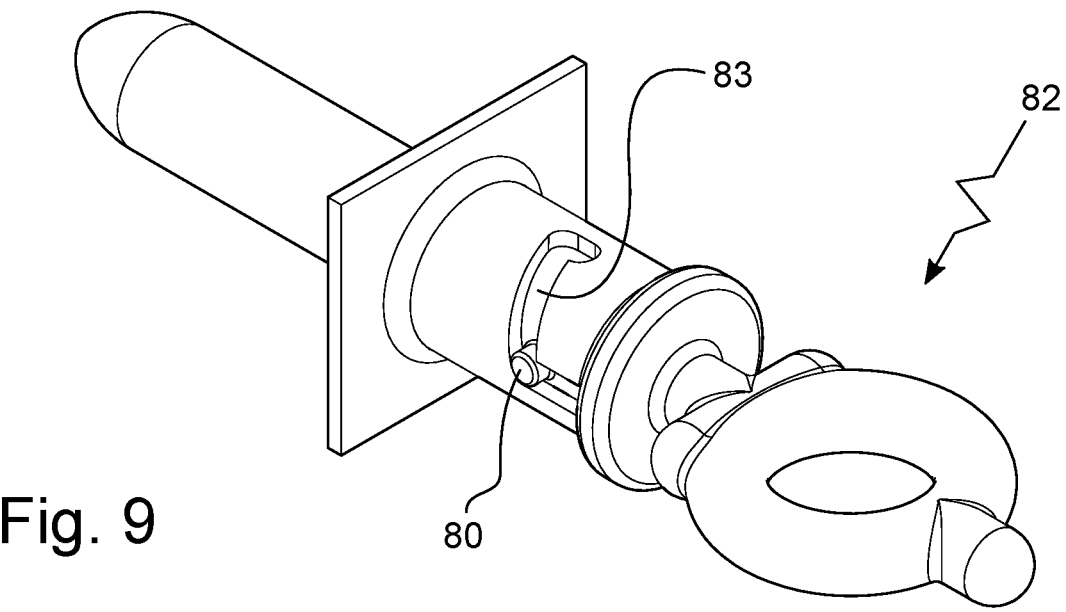
Figure 10:
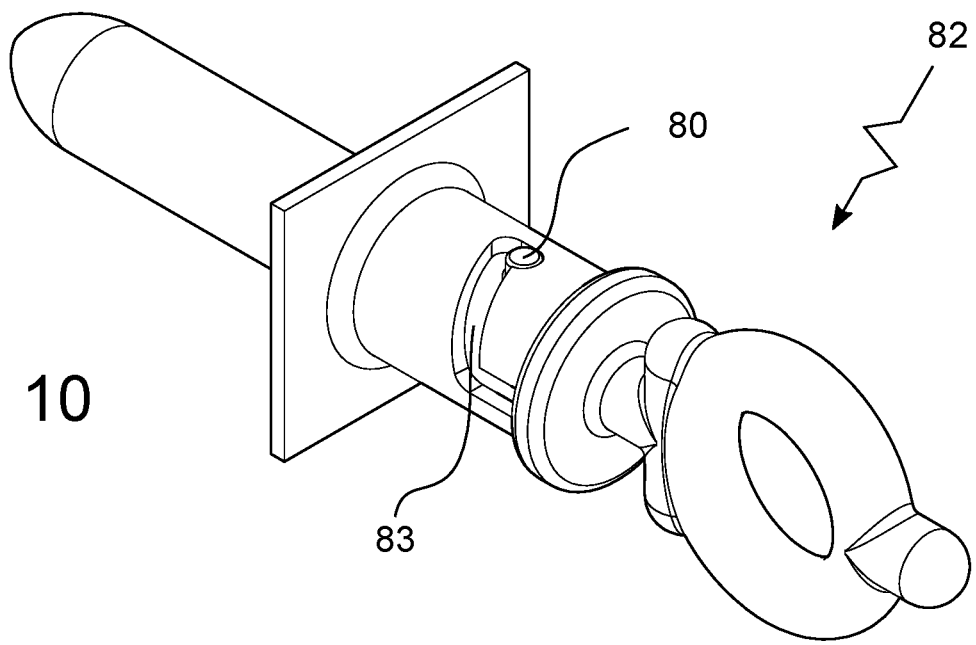

The pin parts and mount parts may cooperate in various ways, such as the detent and opening relationship shown in FIGS. 1-7. The pin parts and mount parts may also cooperate by a relative twisting operation as shown in FIGS. 8-10. A pin 80 extends transversely from pin 82 is received in a slot 83 on cantilever mount 84. When the pin 80 reaches the end of a first portion of the slot 83 it may be rotated (twisted) largely laterally following a laterally directed portion of the slot 83 to a recess 85 at the end of the slot 83, the walls of which recess 85 resist movement of the pin 80 back through the slot 83.

Figure 11:
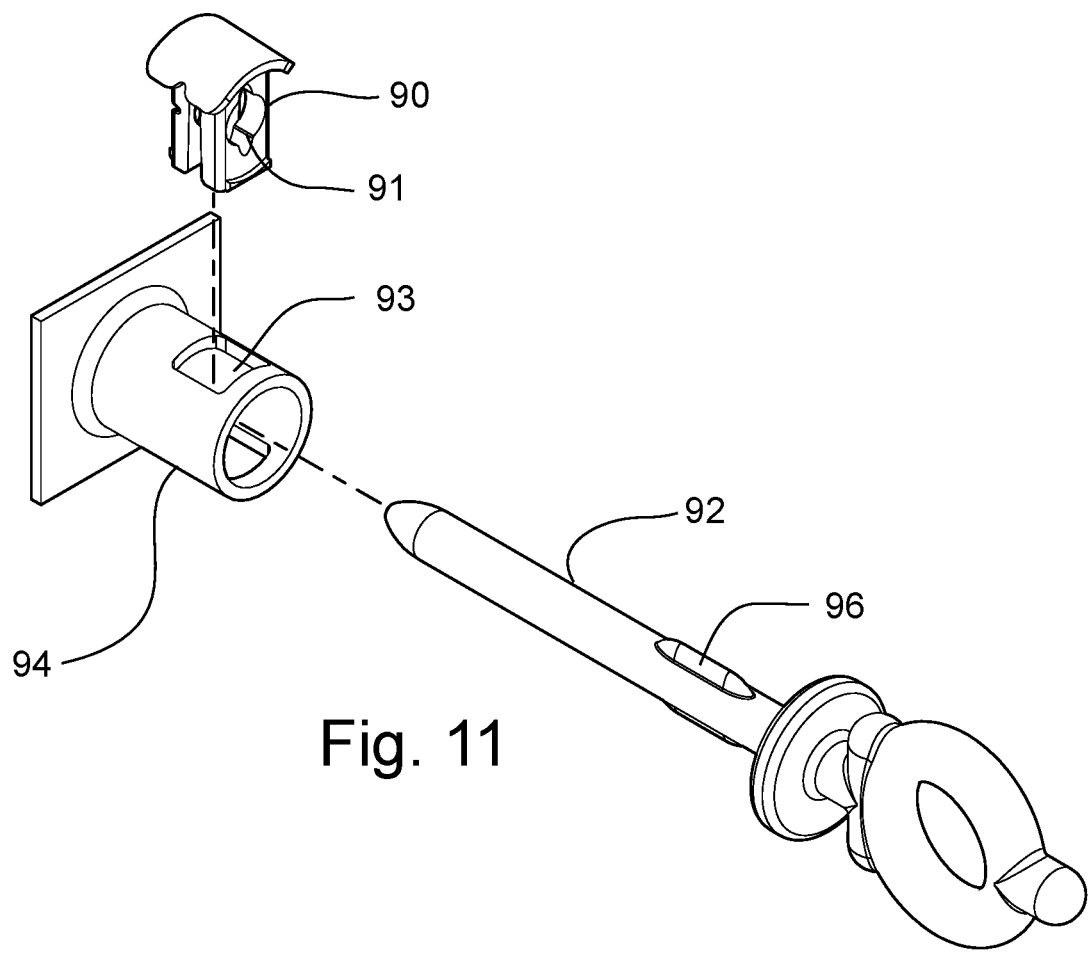

A further example of cooperating pin parts and mount parts for securing a pin in a cantilever mount is shown in FIGS. 11-13. In this example, an insert 90 has a keyhole 91 extending transversely through the insert 90. The insert 90 fits through an opening 93 in cantilever mount 94 and pin 92 has a keyed portion 96 shaped to fit in the keyhole 91. The pin 92 may be inserted in the cantilever mount 94 through the insert 90 until the keyed portion 96 either registers at the center of the insert 90 or passes through the insert 90 as shown in FIG. 12, and then the pin 92 may be rotated to lock the pin 92 in the cantilever mount 94 as shown in FIG. 13.

Figure 14:
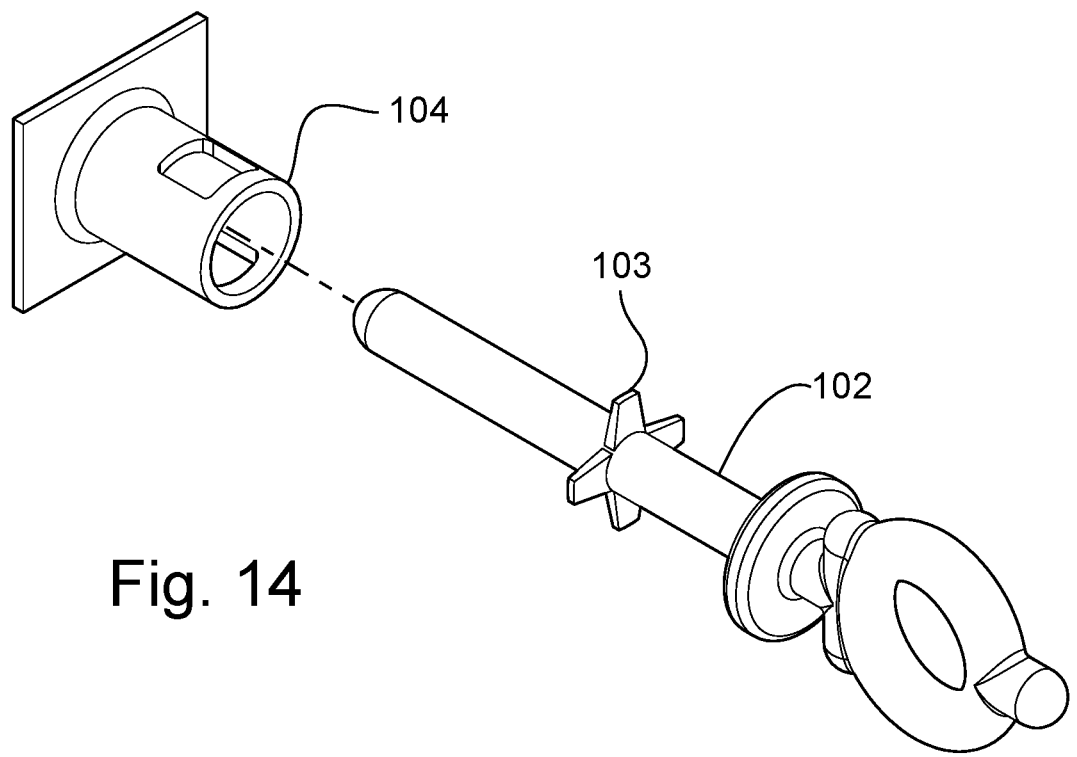
FIG. 14 shows a fourth embodiment of a pin and pin mount.

A further example of cooperating pin parts and mount parts for securing a pin in a cantilever mount is shown in FIG. 14. A pin 102 has flexible flanges 103 that bend when passing through cantilever mount 104 and then expand after passing through the cantilever mount 104 to secure the pin 102 in the mount 104.

Figure 15:
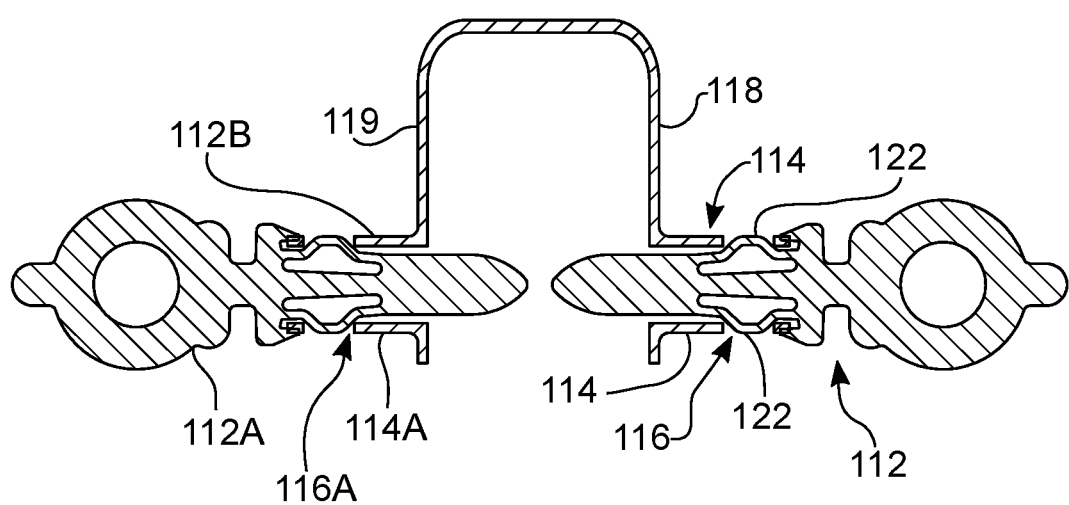
FIG. 15 shows a fifth embodiment of a pin and pin mount.

FIG. 15 shows an alternative embodiment of a pin and cantilever mount. In this example, there are two pins 112 and 112A, though only one need be used if it is made longer. The pins 112 and 112A are received respectively within cantilever mounts 114 and 114A. Cantilever mount 114 is located within wall 118. Cantilever mount 114A is located within wall 119. The cantilever mounts 114 and 114A may be formed of cylindrical sections for receiving pins 112 and 112A respectively, with openings 116 and 116A respectively for receiving detents. The pins 112 and 112A may be made in the same way as each other, so only one is described here in more detail. Pin 112 includes a pair of detents 122 located on opposite sides of the pin 112 but at the same distance from the ends of the pin 112. The detents 122 are received by openings 116 in cantilever mount 114. The detents may be made with flat tops and equally sloped sides. The material of the pins 112, 112A may be a flexible plastic so that the detents 122, 122A, are readily depressed to slide into the cantilever mounts 114, 114A and pop up into the openings 116, 116A. The following discussion applies equally to the pins 112 and 112A.

While the pin 52 is shown as cylindrical, which simplifies insertion of the pin in the cantilever mount 54, the pin 52 may have any suitable cross-sectional shape that may fit in and be received by the cantilever mount 54, and the cantilever mount 5 may be correspondingly shaped. The pin 52 may also extend in some embodiments fully across between the walls 48 and 49, and may extend into the cantilever mount on the opposite side of the cover from where the pin enters the wall 48. If a second cantilever mount is not present, then the pin may extend into an opening in the second wall 49 that is not provided with mount parts. The nose or tip of the pin 52 may be rounded and tapered to facilitate insertion of the pin 52 into the cantilever mount 54 and also into an opening in the second wall 49. The nose of the pin 52 may also be press fit into an opening in the second wall 49. If two pins are used, passing through opposite sides of the cover, the pins may also meet within the part 24 and may be configured as male and female parts so that one is received in the other. The cover and pin may be made of any suitable polymer that is resistant to weather conditions and preferably also to high temperatures while remaining sufficiently flexible to fit on the component. The cover and pin may be spray or injection moulded or printed or made by any other suitable manufacturing process.

Figure 16:
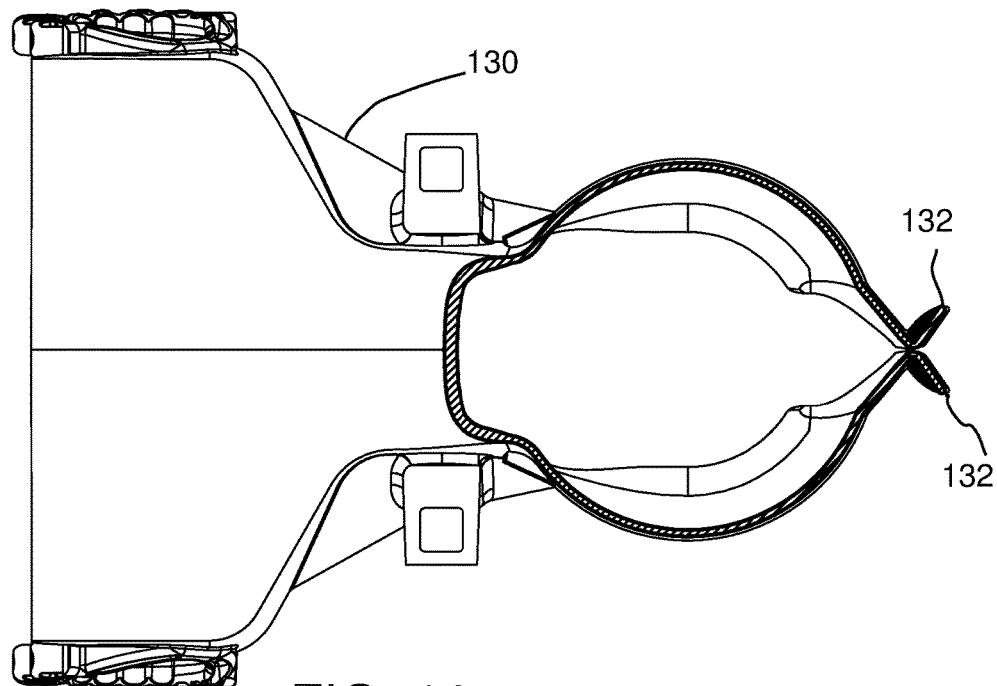
FIG. 16 shows a section through a cut out cover corresponding to the line A-A in FIG. 17.
Figure 17:
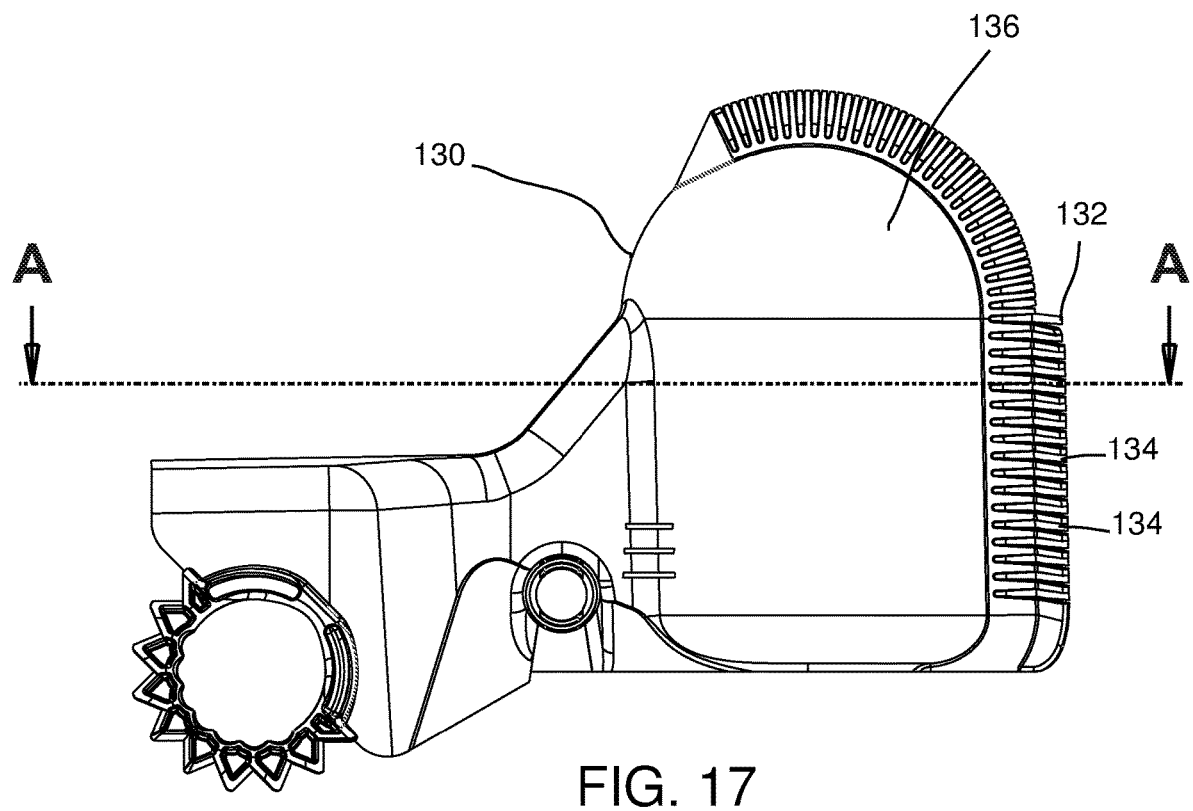
FIG. 17 shows a cut out cover in which flanges for receiving a clip are formed as fingers extending from the body of the cover.

In FIGS. 16 and 17, there is shown a cut out cover 130 that may be made in accordance with any of the embodiments of FIGS. 1-15, but with flanges 132 for receiving a clip, such as clip 36, that are made of individual fingers 134 that extend from the main body 136 of the cut out cover 130. The fingers 134 are sufficiently flexible to allow a conductor to pass between the flanges 132 without flexing the main body 136. The clip 36 may slide over the flanges 132 to secure the cut over cover 130 on a cut out while providing additional protection of the cut out from wildlife.

The invention claimed is:

1. An apparatus for protecting a component of a power distribution system against wildlife, the apparatus comprising:
 a pin;
 a cover having a first wall and a second wall, the first wall and the second wall being spaced apart by a space to receive a part of the component, the first wall having an opening for receiving the pin;
 a cantilever mount at the opening for supporting the pin in the first wall; and
 the pin mounted in the cantilever mount, the pin having a tip, and the pin extending into the space with a gap between the tip of the pin and the second wall,
 wherein the cantilever mount comprises a mount part that cooperates with a corresponding pin part on the pin to secure the pin in the cantilever mount, and
 wherein the mount part comprises a slot through a wall of the cantilever mount and the corresponding pin part comprises a detent on the pin, the detent and slot being positioned so that the detent of the pin are locked in the slot in the cantilever mount.

2. The apparatus of claim 1, wherein the cantilever mount comprises a first portion extending away from the first wall on at least a first side of the first wall, the first portion forming a support for holding the pin in a cantilever position in the first wall.

3. The apparatus of claim 1, wherein the cantilever mount is formed at a step in the first wall.

4. The apparatus of claim 1, wherein the cantilever mount comprises a tube.

5. The apparatus of claim 1, wherein the second wall has an additional opening for receiving an additional pin and an additional cantilever mount at the additional opening for supporting the additional pin in the second wall.

6. The apparatus of claim 5, wherein the additional cantilever mount comprises a first portion extending away from the second wall on at least a first side of the second wall, the first portion forming a support for holding the additional pin in a cantilever position in the second wall.

7. The apparatus of claim 5, wherein the additional cantilever mount is formed at a step in the second wall.

8. The apparatus of claim 5, wherein the additional cantilever mount comprises a tube.

9. The apparatus of claim 1, wherein the pin further comprises a ring configured and sized to be grabbed by a hotstick.

10. The apparatus of claim 1, wherein the detent comprises a flat top having sloping sides of equal slope that is depressible to enter the cantilever mount and to be received by the slot in the cantilever mount.

11. The apparatus of claim 1, wherein the pin further comprises a flange positioned on the pin at a location that prevents the pin from passing beyond where the detent is secured in the slot.

\* \* \* \* \*